Jan. 11, 1966 C. L. BROWN 3,228,562
AUTOMATIC TIMING AND DISPENSING DEVICE
Filed April 20, 1964 2 Sheets-Sheet 1
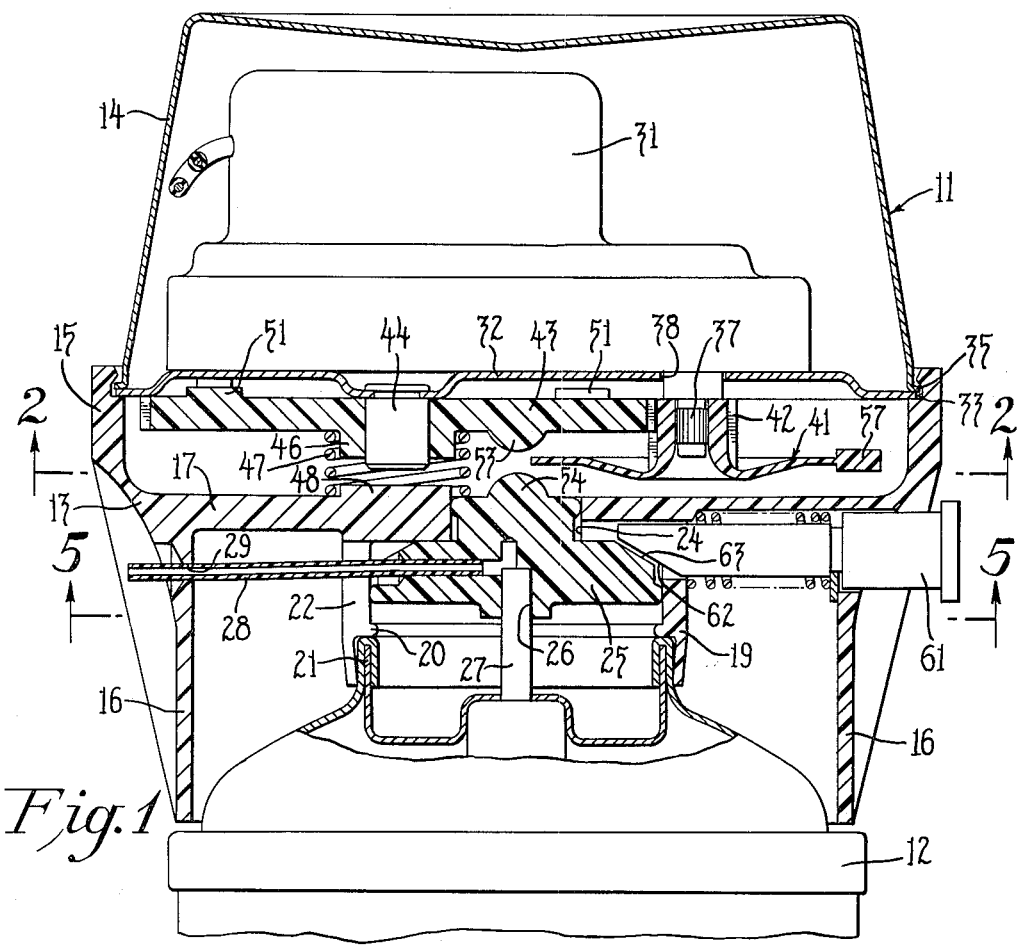
Fig. 1
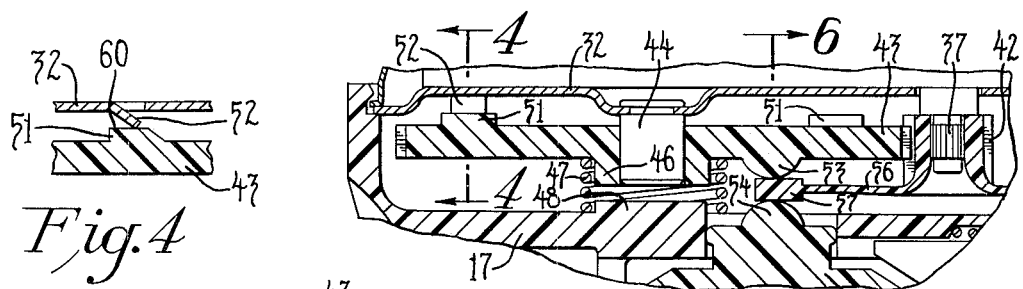
Fig. 4
Fig. 3
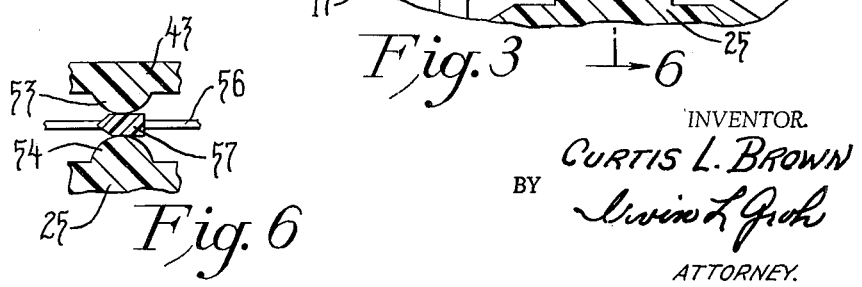
Fig. 6
INVENTOR.
CURTIS L. BROWN
BY
Irwin L. Groh
ATTORNEY.

INVENTOR.
CURTIS L. BROWN
BY Irving L. Groh
ATTORNEY

United States Patent Office 3,228,562
Patented Jan. 11, 1966

3,228,562
AUTOMATIC TIMING AND DISPENSING DEVICE
Curtis L. Brown, 205 Stratford Drive, Owosso, Mich.
Filed Apr. 20, 1964, Ser. No. 361,130
9 Claims. (Cl. 222—70)

This invention relates to timing devices for actuating valves, switches, and the like and, more particularly, to a device for automatically actuating a device, such as the valve stem of an aerosol container, at regular intervals and for predetermined periods of time.

One of the more specific uses of the invention is for actuating the valve on aerosol containers to dispense such materials as decongestants, disinfectants, deodorizers, insecticides, and the like. Many attempts have been made to produce a satisfactory device of this type but for the most part they are unsatisfactory because they are not dependable or are too complicated and expensive to be acceptable.

Devices of this type must be capable of actuating a valve or the like for a very brief but accurately controlled period of time and at widely spaced intervals. For example, if a valve is to be depressed for a period of three seconds once every 30 minutes, some actuating means must be provided to quickly actuate the valve, maintain the valve actuated, and quickly release the valve at the end of three seconds. Thereafter, the actuator must be maintained inoperative for a relatively long time before it comes into operation again. Quite obviously, gradual actuating and releasing of the valve is unsatisfactory. As a result, many of the prior attempts at an automatic timing device have used energy storing mechanisms such as springs which are compressed during the interval between actuations and which are released suddenly to actuate the valve. The release mechanisms employed usually rely on the alignment of very slowly moving parts and, as a result, the point at which release will take place is established gradually instead of instantly and the point cannot be accurately predicted. As a result, it is necessary to use very accurately made components or to provide means for adjustment. Furthermore, it is necessary to quickly release the valve at the expiration of the desired period of operation, which is difficult to accomplish with slowly moving parts. In addition, time is required to accomplish energy storage which can place a serious limitation on the brevity of the desired interval separating periods of actuation.

The present device, on the contrary, does not rely on energy storage mechanisms but rather employs an extremely simple arrangement of two basic components, one of which determines the interval between periods of actuation and the other of which determines the duration of the actuation period. Furthermore, the device for causing actuation of the valve is driven directly from an electric motor or the like so that it is capable of exerting a substantial force.

It is a general object of the invention to provide a timing mechanism for actuating a device such as the valve on an aerosol container.

It is a further object of the invention to provide a timing mechanism which is capable of very accurately selecting a period of short duration from a much larger time portion and actuating a device such as a valve or the like during said period.

Still another object is to provide a timing mechanism which uses a minimum number of moving parts and in which the fastest moving part determines the duration of actuation and the slowest moving part determines the interval between actuations.

An additional object is to provide a simple, compact timing device which can be used with an aerosol container and can be supported directly on the container in such a manner that it occupies little more space than a cover member.

These and other objects are attained by the present invention, various novel features of which will be apparent from the following description and from the accompanying drawings disclosing a preferred embodiment of the invention.

FIGURE 1 is a sectional view of the combined timing and dispensing mechanism;

FIGURE 3 is a partial sectional view similar to FIGURE 1 but showing a different operating position of the mechanism;

FIGURE 4 is a partial sectional view taken on line 4—4 in FIGURE 3;

FIGURE 6 is a partial sectional view taken on line 6—6 in FIGURE 3; and

Figure 5:
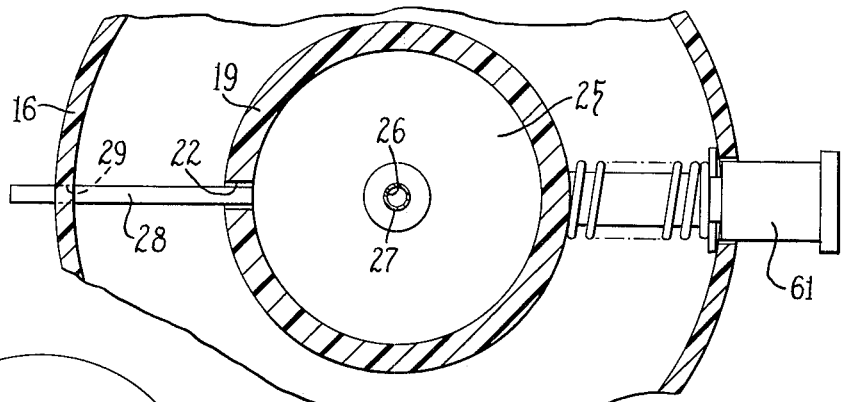
FIGURE 5 is a sectional view taken on line 5—5 in FIGURE 1.

Referring to the drawings, the entire dispensing and timing device 11 is adapted to be supported on top of a conventional aerosol dispenser 12 and is contained in a housing assembly including a lower member 13 made of plastic material and a cap 14. The lower member 13 has upper and lower tubular portions 15 and 16 coaxial with each other and separated by an integral wall 17. The lower tubular portion 16 is of approximately the same diameter as the exterior of the aerosol container 12 and the interior presents a coaxial sleeve part 19 formed integrally with the underside of wall 17. An annular flange 20 is formed within sleeve part 19 and acts to engage the bead 21 which is formed at the top or neck of almost all aerosol containers. This engagement determines the relative axial position of the timing device 11 and the container. The sleeve part 19 is split to form a gap 22 (see FIGURE 5) which permits the sleeve 19 to flex and to grip the sides of the bead 23 and secure the timing device 11 in the desired position on the container 12.

The sleeve 19 is coaxial with an opening 24 in the wall 17 and a valve actuator 25 is slidably mounted with portions within the sleeve 19 and within the opening 24. The actuator is provided with a cavity 26 for receiving the standard valve stem 27 of aerosol containers. The cavity 26 communicates with a flexible tube 28 which extends through the gap 22 in sleeve 19 and an opening 29 in the lower wall 16. Upon a downward displacement of the valve actuator 25, the valve stem 27 is displaced downwardly on its axis and atomized contents of the aerosol container 12 are ejected through the flexible tube 28 to the exterior of the timing device 11. The flexible tube 28 permits full movement of the valve actuator 25 without restricting fluid flow.

The mechanism for automatically actuating the valve stem 27 at predetermined intervals is driven by means of a motor 31 mounted on a plate 32 spaced above the wall 17 and having its perimeter seated in an annular groove 33 formed within the upper tubular wall 15. The cap 14 covers the motor 31 and is provided with a flange 35 which also fits in the annular groove 33. The motor is of a type readily available and may be of a very low speed. In the preferred embodiment, the motor 31 delivers one revolution per minute to the output shaft 37 which projects through an opening 38 in the plate 32. A rotatable element 41 including a gear portion 42 is rigidly connected to the shaft 37 to rotate therewith. The teeth of the relatively small gear 42 are engaged with the teeth on a larger gear 43 which rotates on a shaft 44 fixed to the base plate 32. The larger gear 43 also is free to move axially a limited amount on the shaft 44 during which time its teeth remain in engagement with the teeth on the smaller gear 42 to provide a form of spline connection. The gear 43 has a hub 46 which fits within the inner diameter of a coil spring 47. The upper surface of the wall 17 is fitted with a pad 48 of the same diameter as the hub 46 to receive the opposite end of the spring 47 which is biased between the wall 17 and gear 43 to continuously urge the latter upwardly toward the base plate 32.

The larger gear 43 is provided with a pair of diametrically opposed ramp portions 51 on its upper surface. A pair of tabs 52 is similarly disposed to depend from the base plate 32 to engage the ramps 51 during rotation of the gear 43. The ramps 51 and complementary tabs 52 act as cams to urge the gear 43 downward against the biasing action of spring 47. As the tabs 52 pass over the ends of the ramps 51, the spring 47 returns the gear 43 to its original position as shown in FIGURE 1. The pair of ramps 51 results in deflection of the large gear 43 downwardly on its shaft 44 twice during each revolution of the gear 43.

A semispherical button or phasing element 53 is rigidly fixed to the bottom of the large gear 43 and in radially spaced relation to the shaft 44 to travel in a path which passes button 53 over a button 54 formed at the top of the valve actuator 25. The button 53 comes into alignment with the valve button 54 and moves toward the latter once every revolution of the gear 43, although the latter moves axially downward under the influence of the cams 51 and 52 twice during each revolution.

Figure 2:
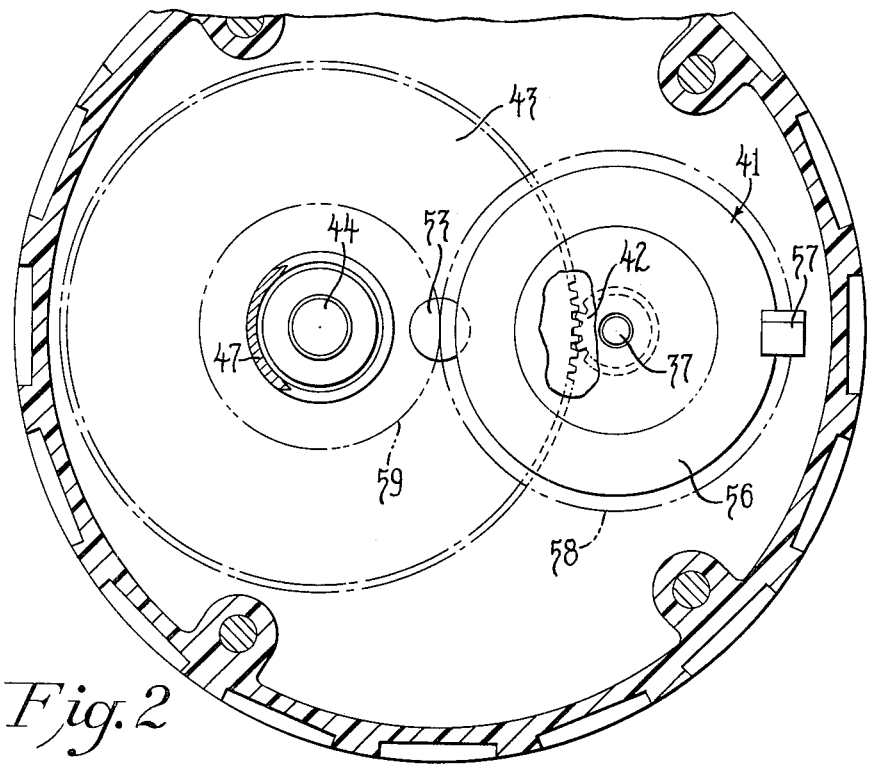
FIGURE 2 is a sectional view taken on line 2—2 in FIGURE 1.

The rotatable element 41 which includes the small gear 42 also is provided with a disc portion 56 which has a thin cross section and is made of a plastic material to afford axial flexibility of the outer annular portion. The outer periphery of the disc 56 is provided with an actuator element 57 which, as best seen in FIGURES 1 and 6, is wedge shaped and formed integrally with the disc 56. The actuator 57 travels in a circular path indicated in broken line at 58 in FIGURE 2. Path 58 is tangent to the broken-line circle 59 describing the path of the button 53. The axis of displacement of the valve stem 27, the valve actuator 25, and the point of tangency of circles 58 and 59 are in alignment with each other. The vertical thickness of the actuator 57 is such that when the valve actuator cap 25 is in the valve-closed, or upper position shown in FIGURE 1 and when the gear 43 is in its normal, upper position, the buttons 53 and 54 are so spaced that the actuator 57 is free to pass therebetween. The disc 56 affords sufficient flexibility so that the actuator 57 may be deflected downwardly to pass between buttons 53 and 54 without retarding rotation of the gears 42 and 43. This will be particularly apparent from a comparison of the parts in FIGURES 1 and 3. In the latter illustration, the gear 43 is shown deflected downwardly to its lowest position which requires deflection of disc portion 56 to permit actuating element 57 to pass under button 53. At the same time, button 54 is displaced downwardly to actuate valve stem 27.

In the disclosed embodiment of the invention, the small gear 42 is provided with 15 teeth and the large gear 43 is provided with 96 teeth. Because the small gear rotates once every minute, the large gear requires 6 and 6/15 minutes to complete a single revolution. Furthermore, a given tooth on the small gear 42 will engage a given tooth on the large gear 43 once every five revolutions of the latter, or once every 32 seconds.

If revolving of the gears 42 and 43 is started when the two buttons 53 and 54 and the actuating element 57 are in alignment with each other, it will require 32 minutes before this same condition of alignment will reoccur. During these 32 minutes, the actuating element 57 will have passed over the valve button 32 times and the gear 43 will have been deflected downwardly ten times. For 31 of the times that the actuator passes over the button, it is ineffective because the gear 43 and button or phasing element 53 is spaced too far from the button 54. However, on the 32nd revolution, the gear 43 will have been depressed downwardly toward the valve button 54. As the wedge-shaped, actuator element 57 attempts to pass between the closely spaced and aligned buttons 53 and 54, the valve actuator 25 and stem 27 are depressed downwardly. Because the large gear 43 turns very slowly, the buttons 53 and 54 remain close to each other for several seconds and the length of time during which the valve 27 is depressed is determined by the effective length of the actuating element 57 measured in the direction of its path of travel. As best seen in FIGURE 4, the effective length is determined by the surface 60. Since the valve actuator 57 travels at the rate of one revolution each minute, the length of the arc traveled in one second is 6°. Consequnetly, if the period of valve actuation is selected at three seconds, the surface 60 of the actuating element must be sufficiently long to be effective through an 18° arc.

Figure 7:
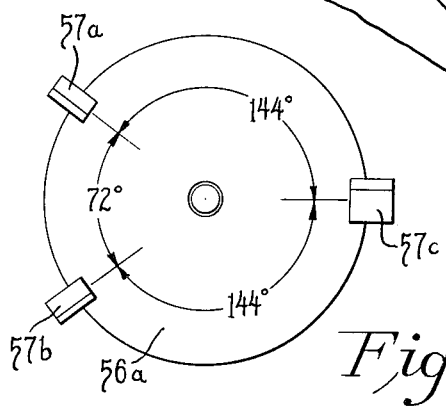
FIGURE 7 is a bottom view of a component used in a modification of the invention.

It will be apparent that the interval between periods can be made longer or shorter by selecting a different ratio of teeth between the large and small gears. The interval can be made smaller by deflecting the large gear downwardly more frequently. This may be accomplished by increasing the number of ramps 51 on the gear 53. Another method is to provide an additional button or buttons 53 on the gear 43 to cooperate with an additional actuator 57 on the disc 56 attached to the small gear. It should be noted that an additional actuating element or elements may be so placed that the intervals between actuations are equal or unequal. For example, the timing and dispensing mechanism may be provided with an actuating disc 56a as shown in FIGURE 7 in which three actuating elements 57a, 57b, and 57c are spaced with 72° between element 57a and 57b, 144° between elements 57b and 57c and also between 57a and 57c. This arrangement results in actuation of the valve stem 27 twice at six-minute intervals and then at a 20-minute interval during each 32-minute period. By providing actuating elements of different lengths, the duration of each actuation can be varied. With the arrangement shown in FIGURE 7, the duration of valve actuation is 1½ seconds at six-minute intervals and three seconds, twenty minutes later. This is an example of one of the various modifications which is possible and would be of particular utility under conditions where actuation should be frequent during one portion of a complete cycle and less frequent during the remaining portion of the cycle. As an example, by using a 24-hour cycle, an insecticide might be dispensed at frequent intervals at night but less frequently during daylight hours.

It will be noted that by using gears 42 and 43 with teeth so numbered that the larger number divided by the smaller does not result in a whole number, the cycle of operation can be made very long. As previously described, 96 teeth on gear 43 and 15 teeth on gear 42 result in a 32-minute period. On the other hand, 96 teeth divided by 12 teeth results in a whole number and the condition of parts would reoccur every eight minutes.

Although the present device is intended for automatic, unattended operation, the valve cap 25 may be depressed downwardly manually and independently of the power-driven, automatic mechanism by means of a spring biased plunger 61 which has an inclined surface 62 at its inner end cooperating with a complementary bevel 63 on the valve cap. Movement of the plunger 61 axially inward results in downward displacement of the valve actuator 25 and deflection of valve stem 27 without otherwise interfering with the automatic operation or timing.

It should be noted that the device is capable of many variations, all of which can be accomplished by an exceedingly simple arrangement which employs only three movable components. These components are the large gear 43, the actuating element 41, and the valve cap 25. Furthermore, of the two gear members, the fastest moving is used to actuate the valve element for relatively brief periods, and the slower moving is used to determine the relatively large intervals between periods of actuation.

It should be understood that it is not intended to limit the invention to the above described forms and details, and that the invention includes such other forms and modifications as are embraced by the scope of the appended claims.

It is claimed and desired to secure by Letters Patent:

1. In a timing mechanism for actuating a device such as a valve by displacing it periodically for predetermined periods, the combination comprising a member supported in fixed, spaced relation to said device and means driving said member in rectilinear reciprocation toward and away from said device in a predetermined, repeated path and at a uniform rate, an actuating element, means driving said actuating element in a path passing between said device and said member and at a uniform but relatively higher rate than the rate of reciprocation of said member, said device being actuated upon movement of said member toward said device and simultaneous alignment of said member and said actuating element.

2. In a timing mechanism for actuating a device by displacing it periodically, an actuating element, means mounting said actuating element for rotation in a path passing through the axis of displacement of said device, means for moving said actuating element at a fixed speed, a member supported for reciprocable movement in a predetermined path toward and away from the device, and means for reciprocating said member at uniformly spaced intervals, said actuating element being operable to deflect said device when said member has been reciprocated toward said device and said actuating element simultaneously passes between said element and said member.

3. In a timing mechanism for actuating a device by displacing it periodically, a gear member rotatable about an axis disposed parallel to the device to be displaced and being periodically movable axially toward and away from said device, means for rotating said member at a uniform rate, additional means responsive to rotation of said member for periodically moving the latter axially, a timing gear connected in driving relation to said member and having an actuating element mounted for movement in a circumferential path passing between said member and said device, said element being operable to actuate said device when said element is disposed between said device and said member and the latter has been moved toward said device.

4. In a timing mechanism for actuating a device by displacing it a predetermined amount, a gear member rotatable about an axis disposed parallel to the device to be displaced and being periodically movable axially toward and away from said device, cam means for periodically displacing said gear member a predetermined distance on its axis of rotation, a phasing element mounted on said gear member for movement in a circular path passing over said device, gear means connected in driving relation with said gear member for rotating the latter at a uniform rate, an actuating element connected to said gear means and being rotatable in a circumferential path passing over said device and between the latter and said gear member, said actuating element displacing said device upon said periodic movement of said gear member toward said device and simultaneous movement of said actuating element between said phasing element and said device.

5. In a timing mechanism for periodically actuating a device by displacing it, a first gear member rotatable about an axis disposed parallel to the device to be displaced and being periodically movable axially toward and away from said device, a second gear member engaged with said first mentioned gear member for rotation at a relatively higher speed, means for driving said gear members, a phasing element disposed on said first gear and radially spaced from the axis of rotation to travel in a circular path, an actuating element rotatable with and radially spaced from the axis of rotation of said second gear to describe a path tangent to said circular path, said device to be operated being disposed in alignment with the point of tangency of said paths, means for periodically displacing said first gear toward said device at least once during each revolution of said first gear, said phasing element approaching but remaining in spaced relation to said device during said displacement and said device being actuated each time the latter and both of said elements are in alignment with each other and said first gear member has been displaced.

6. In a device for automatically and periodically actuating a device by displacing it, a first member rotatable about an axis parallel to the direction of displacement of said device and being simultaneously movable axially toward said device from a normal position to an operating position spaced from said device, a second member rotatable about an axis parallel to the axis of said first member, means for rotating said first and second members at a fixed, relative speed, a phasing element disposed on said first member and radially spaced from the axis of rotation thereof to travel in a circular path, an actuating element rotatable with and radially spaced from the axis of rotation of said second member to describe a path generally tangent to said circular path, said device to be operated being disposed in alignment with the point of tangency of said paths, means for periodically displacing said first member to said operating position at least once during each revolution of said first member, said actuating element having a thickness greater than the spacing between said device and said phasing element when said first member is in said operating position and said device and phasing element are in alignment with each other at said point of tangency, said device being actuated by movement of said actuating element between said aligned phasing element and device when said first member is in said operating position.

7. In a device for automatically and periodically actuating a device by displacing it, a first gear member rotatable about an axis disposed parallel to the device to be displaced and being periodically movable axially toward and away from said device, a second gear member in driven engagement with said first mentioned gear member for rotation at a relatively higher speed, means for driving said gear members at a constant speed, said first gear having a larger number of teeth than said second gear, the number of teeth being such that the number on said first gear divided by the number on said second gear results in other than a whole number, a phasing element disposed on said first gear and radially spaced from the axis of rotation to travel in a circular path, an actuating element rotatable with and radially spaced from the axis of rotation of said second gear to describe a path tangent to said circular path, said device to be operated being disposed in alignment with the point of tangency of said paths, means for periodically displacing said first gear toward said device at least once during each revolution of said first gear, said phasing element approaching but remaining in spaced relation to said device during said displacement, said actuating element normally passing freely between said first gear and said device and forcing said device away from said phasing element when the latter is at said point of tangency simultaneously with said actuating element.

8. In a device for automatically and periodically actuating a device by displacing it, a base unit supported in fixed relation to said device, a first member supported on said base for rotation at a predetermined constant speed and for limited axial movement, a second member supported on said base in driven relation to said first member for rotation at a relatively higher speed, complementary cam means on said base and on said first member for engagement wtih each other to deflect said first member away from said base and toward said device, a device to be operated upon limited deflection in a direction parallel to the axes of rotation of said members, an actuating element connected to said second member for rotation in a path passing between said first member and said device, said element having a thickness less than the spacing between said device and said first member when the latter is closest to said base and more than the spacing when said first member is closest to said device, said element displacing said device when said operator passes between said device and said first member and the latter is closest to said device.

9. In combination with an aerosol container having a neck portion and a depressible valve stem, a base unit including an annular sleeve for resiliently and releasably gripping said neck, a cap device slidable axially in said sleeve and affording a cavity for receiving said stem, a gear member mounted for rotation and axial movement about an axis disposed parallel to the axis of movement of said cap, means for periodically moving said gear member on its axis of rotation from a normal position to an operating position, a phasing element mounted on said gear member for movement in a circular path passing over said cap, gear means connected in driving relation with said gear member for rotating the latter at a uniform rate, an actuating element connected to said gear means and being rotatable in a circumferential path passing over said cap and between the latter and said gear member, said actuating element being operative to displace said device upon movement of said gear member to said operating position, alignment of said phasing element and said cap, and simultaneous movement of said actuating element between said phasing element and said cap.

References Cited by the Examiner
UNITED STATES PATENTS 3,139,218  6/1964  Cairelli _____ 222—504 X M. HENSON WOOD, JR., *Primary Examiner.*

LOUIS J. DEMBO, *Examiner.*